W. L. MILHOLEN.
Shovel-Plow.
No. 30,746.
Patented Nov. 27, 1860
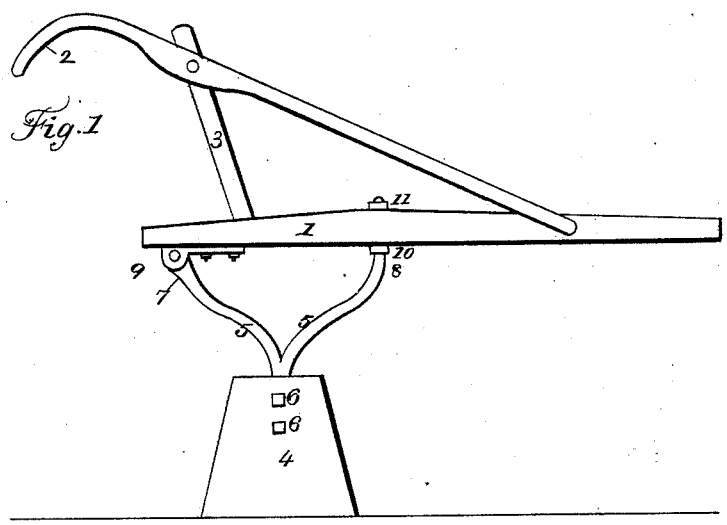
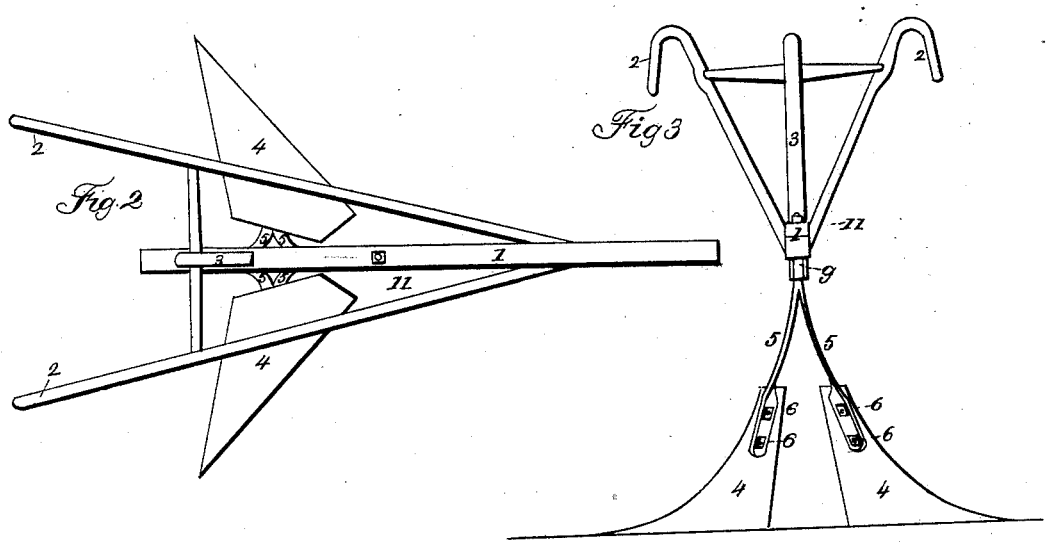
Witnesses:
Jno Pratt
R M Harrison
Inventor:
William L Milholen

UNITED STATES PATENT OFFICE.

WILLIAM L. MILHOLEN, OF CENTRE, ALABAMA.

IMPROVEMENT IN COTTON-SCRAPERS.

Specification forming part of Letters Patent No. 30,746, dated November 27, 1860.

*To all whom it may concern:*

Be it known that I, WILLIAM L. MILHOLEN, of Centre, in the county of Cherokee and State of Alabama, have invented an Improvement in Cotton-Scrapers, the construction and operation of which I have described in the following specification and illustrated in its accompanying drawings with sufficient clearness to enable competent and skillful workmen in the arts to which it pertains or is most nearly allied to make and use my invention.

My invention is illustrated in the accompanying drawings, as follows:

Figure 1 is a side elevation of the implement. Fig. 2 is a plan of it. Fig. 3 is a rear elevation.

1 is the beam, and 2 2 are the handles, constructed in a manner very similar to that commonly employed.

3 is a standard framed into the beam to support the handles.

4 4 are scrapers or shares secured to the braces 5 5, usually by bolts 6 6. These braces unite near the top in two parts, 7 and 8, that marked 7 being connected by a hinge-joint, as shown, to the piece 9, which is bolted to the beam and forms a part of this hinge-joint. The part 8 passes through the beam at a point farther forward, as shown, and is secured by nuts 10 and 11 above and below the beam, as represented. This furnishes the means of adjusting the pitch or running depth of the shares or cutters 4 4 in the most reliable and satisfactory manner within any reasonable range of adjustment, for it is obvious that by screwing down the nut 11, so as to allow the beam to fall on the brace or standard 8, and then screwing down the nut 10, the parts are brought to a firm bearing again, and the dip of the blades will be changed, so as to cause them to penetrate a less distance into the soil. Moving the nuts 10 and 11 in the other direction upon the screw, a greater dip will be given, and this range may be varied to any reasonable extent, and is much more reliable than the mode of adjusting by the clevis, which is liable to derangement in turning, and is also very limited in its range from the necessity of the case. This arrangement which I have described and shown enables the planter to give a permanent adjustment to the scraper to correspond with the state of the crop at the time.

Having fully described my invention, I claim—

The arrangement of the beam 1, braces 5 5, bolts 6 6, arms 7 and 8, nuts 10 and 11, shares 4 4, hinge-joint 9, standard 3, and handles 2, as described, for the purpose specified.

WILLIAM L. MILHOLEN.

Witnesses:
J. L. CUNNINGHAM,
JNO. PRATT.